UNITED STATES PATENT OFFICE.

WALTER P. JENNEY, OF NEW YORK, N. Y.

IMPROVEMENT IN OBTAINING A RESINOUS SUBSTANCE FROM PURIFIED SLUDGE-OIL.

Specification forming part of Letters Patent No. 178,061, dated May 30, 1876; antedated February 22, 1876; application filed April 20, 1875.

*To all whom it may concern:*

Be it known that I, WALTER P. JENNEY, of the city of New York, State and county of New York, have invented a new and useful Process of Treating Sludge-Oil, of which the following is a specification:

In the purification of hydrocarbon oils produced by the distillation of crude petroleum, asphalts, or bitumens, or by the destructive distillation of coal, resins, or bituminous shales, the oils are agitated with two per cent. or more of concentrated sulphuric acid, (66° Baumé, 1.86 specific gravity,) in order to remove certain oils contained in the distillate, which would, in course of time, absorb oxygen from the air, and cause the oil to become dark colored and gummy, and also to remove tarry substances and the disagreeable odor. Sulphuric acid combines chemically with these bodies and dissolves them, forming a dark red heavy liquid, which settles on the bottom of the agitator, and can then be readily drawn off from the purified oil. This peculiar compound of sulphuric acid and hydrocarbon oils, dissolved in the excess of acid, is known as "sludge." At present it is purchased by superphosphate manufacturers, who mix it with a little water, which decomposes the compound of acid and oil, producing a weaker acid (about 50° Baumé) used in the manufacture of superphosphate of lime, and a dark-colored offensive oil, which rises to the surface of the acid, and usually is thrown away, no commercial use having been found for it. This waste product is called "sludge-oil."

My invention consists in a new process of treating this sludge-oil to manufacture a resinous substance.

The mode of practicing my invention is as follows: In my process, when the sludge has been decomposed by the addition of water, the sludge-oil is drawn off, and is then purified by repeated washings with water, until the acid remaining in it is removed. For this purpose equal volumes of water and sludge-oil may be used; but the washing can be effected by a less quantity of water. The acid remaining in the oil, if any, is then neutralized with quicklime or caustic soda. The purified oil has a strong and somewhat disagreeable odor, and contains about ten per cent. of volatile oils, which are converted into a hard resin with difficulty. To remove these volatile substances the sludge-oil thus purified is introduced into a still with the addition of from two to four per cent. of caustic soda, or caustic soda, and about two per cent. of the oxides of lead or manganese to oxidize any sulphurous body which may be in the oil and combine with it, and steam is then blown through the oil, the oil being kept hot either by a fire under the still or by the use of steam heated to the required temperature, (between 212° Fahrenheit and 450°.) The action of the steam is continued until no more volatile oils are removed, (usually from five to ten hours.) The steam is then shut off, and the contents of the still allowed to settle, when a sediment of tarry impurities and soda subsides, from which the pure oil may be drawn off. The oil is then introduced into a still or tank, and oxidized by blowing currents of air through it, the oil being kept at a temperature of from 200° to 300° Fahrenheit, either by a slow fire under the still, or by a steam-coil in the bottom of the tank, or by heating the air by a hot-blast oven to the proper temperature before it is blown through the oil, and the action of the air is continued until complete oxidation is effected, and a sample on cooling solidifies to a more or less hard resin.

The time required to effect the oxidation varies with the working temperature, and with the extent of surface of oil brought in contact with the air. I may define it as between four and twelve days. The action of the air upon the oil is stopped when samples on cooling, taken from the contents of the still, are found to be of the proper degree of hardness and toughness for the particular purpose to which the product is to be applied, and after letting the contents of the still settle the hot resin is drawn off from the sediment of soda and impurities.

The action of the air may be accelerated by adding about two per cent. of the oxides of lead or manganese, or about two per cent. of the manganates of soda and potassa to the oil. These substances act either by giving up oxygen to the oil, or by their presence inducing a combination of the oxygen and the hydrocarbon.

An inferior quality of resin may be produced by treating the washed sludge-oil in a still with caustic soda and litharge, (five per cent. soda to one to two per cent. litharge,) and blowing a current of air through it at about the temperature of 350° Fahrenheit, which, at the same time oxidizes the oil and removes the more volatile portions, which are distilled off until it is converted into a resin, which, on cooling, becomes hard and brittle. This process last mentioned requires from two to six days, but the resin produced is darker in color than that made by first treating with steam and then with air at a lower temperature, as the coloring matter is not affected by steam at 400°, while air at that temperature rapidly darkens it by oxidation. Sunlight bleaches the color of sludge-oil, and, at the same time, greatly accelerates the absorption of oxygen from the air. To produce the lightest-colored resins the sludge-oil is steamed with five per cent. of a solution of soda, 20° Baumé, at a low temperature, (about 200° to 250° Fahrenheit for ten hours,) to remove the more volatile portions, and then oxidized and bleached by exposing the oil, in shallow tanks covered by glass, to the action of the sunlight, the oil being kept hot and fluid by a steam-coil in the bottom of the tank, and currents of air blown through it to produce the oxidation.

Inferior qualities of sludge-oil, as those produced in the purification of lubricating-oils, and which contain a large quantity of tarry substances, are treated as follows: The oil is charged into a still, and caustic soda and black oxide of manganese (in the proportion of about five per cent. of soda and two per cent. of manganese) are added, and the charge distilled by a current of steam blown through the oil, assisted by a fire under the still, until only tar and coke remain behind. The distillation commences at about 350° Fahrenheit, and, the fire being increased, the temperature in the still gradually rises to about 800°, when only the thick pitch remains in the still.

By the use of steam under pressure the oil can be distilled with scarcely any decomposition, and the distillate, which is of a yellow or light red color, can be converted into a superior resin by oxidizing it with a current of hot air. The resin produced by this oxidation of sludge-oil is distinguished from all other known resins and resinous substances by its behavior with different chemicals and solvents. It varies in color from yellow to dark garnet red, according to the method of its production. It is hard, brittle, and odorless at ordinary temperatures, tasteless, insoluble, and not acted upon by water, soda, potassa, and ammonia, even when heated.

Alcohol of ninety-five per cent. dissolves but small quantities of this resin, even when boiled with it. Petroleum-naphtha dissolves it very quickly without the aid of heat, producing a varnish. Spirits of turpentine readily dissolves the melted resin, forming a varnish. Benzole, chloroform, and bisulphide of carbon all dissolve the resin, the solution being aided by warming. Ether and a mixture of ether and alcohol, in equal parts, quite readily dissolve it, but not so readily as pure ether. Linseed-oil and olive-oil dissolve the melted resin. A solution of the resin in linseed-oil and spirits of turpentine forms an "oil-varnish." Concentrated sulphuric acid dissolves it completely; the resin separates again on adding water. Nitric acid attacks it violently, and converts it into a brown tarry or gummy substance, having a pleasant peculiar odor. Hydrochloric acid seems to have little or no action on it.

It is well known that it has been proposed to use sludge-oil as a paint-oil, but this has not been attended with practical success. I do not wish to be understood, however, as making claim, broadly, to a process for freeing sludge-oil from the acid by the use of water and caustic alkalies, or by still further purifying it by subjecting it to distillation, or by blowing steam through it, for the purpose of removing impurities, all of which, it is well known, have been practiced since the discovery of the present processes of refining petroleum. Nor do I wish to be understood as laying claim in this application to the resinous substance produced by my process, as that forms the subject-matter of another application by me for Letters Patent.

I claim—

The process herein described for producing from sludge-oil a substance or manufacture possessing the properties or qualities substantially as described, by combining the oxygen of the air with the sludge-oil with the aid and assistance of a moderate degree of heat.

WALTER P. JENNEY.

Witnesses:
 PHILLIPS ABBOTT,
 WILLIAM SCOTT.